United States Patent
Fathauer

[15] 3,675,120
[45] July 4, 1972

[54] IMPEDANCE MEASURING CIRCUIT INCLUDING MEANS FOR AUTOMATICALLY ADJUSTING INITIAL CONDUCTORS THEREOF

[72] Inventor: George H. Fathauer, Decatur, Ill.
[73] Assignee: Harold O. Hill, Jr.
[22] Filed: April 30, 1970
[21] Appl. No.: 33,326

[52] U.S. Cl. .......................................... 324/61 R, 324/57 R
[51] Int. Cl. ............................................. G01r 27/26
[58] Field of Search .............. 324/60, 60 B, 61, 57 B, 61 M, 324/61 B

[56] References Cited

UNITED STATES PATENTS 3,231,814  1/1966  Fathauer et al. ........................ 324/61
3,115,603  12/1963  Fluegel ................................... 324/61 B Primary Examiner—Alfred E. Smith
Attorney—Pendleton, Neuman, Williams & Anderson

[57] ABSTRACT

A grain moisture tester having an impedance measuring capacitive bridge circuit with an unknown capacitance, a manually variable capacitor, and a varactor diode in the arms thereof and an automatic balance circuit including a differential amplifier with inputs coupled across the bridge null points and an output d.c. coupled to the varactor diode and controlling its capacitance is disclosed.

13 Claims, 2 Drawing Figures

Inventor
George H. Fothrower
by Pendleton, Neuman, Williams & Anderson
Atty's

IMPEDANCE MEASURING CIRCUIT INCLUDING MEANS FOR AUTOMATICALLY ADJUSTING INITIAL CONDUCTORS THEREOF

BACKGROUND OF THE INVENTION

This invention relates to impedance measuring circuits and, more specifically, to bridge circuits for measuring relative changes in impedance with means for automatically establishing an initial condition and, still more specifically, to impedance measuring circuits for use in grain moisture testers.

Numerous circuits and schemes are known for measuring relative changes in impedance. They find use when the impedance of a given structure may be taken as a reference point or base line, the actual impedance of the structure being unimportant, and the change in impedance resulting from an alteration in the given structure must be determined. One application of such circuits is in the determination of the moisture content of grains, fibers, or other materials. Ordinarily an electrical circuit is provided including a cell with a relatively fixed capacitance capable of receiving a quantity of the material to be tested. The circuit is brought to some normal, initial, or balance state by the manual adjustment of a variable impedance element with the cell empty. A known quantity of the material under test is placed in the cell and the change in the cell capacitance determined. The determination is usually made in one of two ways, by measuring how far the circuit has deviated from the initial state or by adjusting a variable impedance element to return the circuit to the initial state, the magnitude of the deviation or the required adjustment being indicative of the relative change in capacitance of the cell and, thus, of the dielectric constant of the material in the cell under test. As is well known, the dielectric constant of grain or fibrous material is a direct measure of the moisture content of that material. Examples of such moisture testing circuits may be found in United States Pat. Nos. 2,542,928 to C. N. Kimball, et al., 2,693,575 to K. M. Greenwood, et al., 3,051,894 to D. F. Fathauer and 3,231,814 to D. F. Fathauer, et al.

Grain moisture testers have in the past proven of great value to the farmer. They allow him to easily determine at what point his grain should be sold to maximize his profit. However, a grain moisture tester for use by individual farmers should be inexpensive enough for him to afford and simple enough in operation that he may use it without any knowledge of electric circuits. By the latter requirement it is desirable that the circuit include a minimal number of user-made manual adjustments. Further, the tester should give reliable, accurate results over a long period of time.

SUMMARY OF THE INVENTION

This invention provides a relative impedance measuring bridge circuit particularly adapted for use in grain moisture testers and having an unknown impedance, a manually variable impedance, and a voltage controlled variable impedance element in the arms thereof and circuitry for automatically adjusting the voltage applied to the voltage controlled impedance element to that required to bring the bridge to an initial balance condition and maintaining the voltage on that element at the required level while the measurement is made.

It is, thus, an object of this invention to provide a relative impedance measuring bridge circuit.

It is an object of this invention to provide circuitry automatically establishing an initial or balance condition for use with a relative impedance measuring bridge circuit.

It is an object of this invention to provide a relative impedance measuring circuit for use in a moisture tester.

It is an object of this invention to provide a relative impedance measuring circuit for use in a moisture tester wherein an initial balance condition or state may be established by the user with the utmost ease.

It is an object of this invention to provide a capacity measuring bridge circuit for use in a grain moisture tester having provisions for automatically establishing an initial condition and holding that condition for a prolonged period of time.

It is an object of this invention to provide a moisture tester characterized by simplicity of design, economy of construction, and ease of operation.

Further and additional objects will appear from the following description, accompanying drawings, and appended claims.

DESCRIPTION OF THE PREFERRED EMBODIMENT

In the subsequent description, this invention will be described with relation to its use in a grain moisture tester of a particular construction. It will be obvious to those skilled in the art, however, that it is of much broader application.

Figure 1:
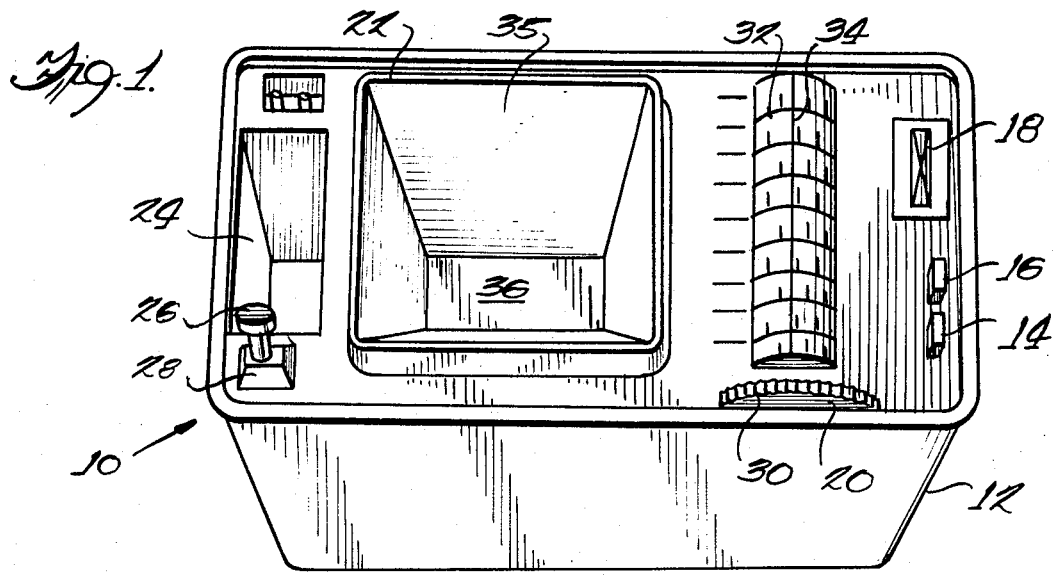
FIG. 1 is a perspective view of a grain moisture tester incorporating one embodiment of the present invention.

A grain moisture tester 10 is shown in FIG. 1; its physical construction and mode of operation will first be described in order that the circuitry of this invention might be more fully understood. The tester is of unitary construction and contained within a single housing 12 having disposed on the upper surface thereof a power switch 14, a balance switch 16, a meter 18, a dial mechanism 20, a hopper and scale combination 22, an opening 24, and a removable thermometer 26 extending into the interior of housing 12 and holder therefor 28. Dial mechanism 20 includes a wheel 30 mechanically connected to both a drum 32 and a variable circuit element included within the circuitry of this invention, but not shown in FIG. 1. Drum 32 is located beneath a hairline indicator 34 and has disposed thereon a plurality of scales which give the percentage of moisture of the grain under test, different scales being used alternatively for different grains or for different weight samples of the same grain.

The hopper and scale combination will be described in more detail in my application to be subsequently filed. Its construction is not necessary to an understanding of this invention. It consists, basically, of a hopper 35 mounted on springs within housing 12, not shown, and used as a spring scale to measure a given weight of material, in this case five ounces. A door 36 is disposed on the bottom of the hopper and is normally closed. When the desired weight of material is within the hopper, door 36 may be opened causing the grain to fall into a grain cell, to be subsequently described, disposed within housing 12 and the moisture measurement made. The tested grain always falls into the cell from the same distance above it, fixed by the hopper height, and the same lateral location, fixed by the hopper lateral position; this helps insure that the grain will be uniformly compacted in the cell between different measurements thus promoting uniformity of results.

In operation of the moisture tester shown, power switch 14 is first depressed to activate the internal circuit. Balance switch 16 is then momentarily depressed to activate the automatic balance circuit of this invention and bring the internal circuitry to an initial, balance condition or state, as will be subsequently described. A balance condition is known to exist when the indices on meter 18 come to a central location. Five ounces of grain are then placed in hopper 35. Thermometer 26 is removed from its holder 28 and used to measure the temperature of the grain in the hopper. The measured grain is released into the grain cell and wheel 30 adjusted to rebalance the internal circuit, again observing meter 18. The percentage moisture content may then be read underneath hairline indicator 34 from the correct scale on drum 32. If the temperature of the grain is significantly different from the standard temperature used in establishing the scales on drum 34, conveniently 80° F., the indicated moisture content should be adjusted by an amount which may be read from a chart or scale supplied with the tester or, conveniently, printed on the thermometer itself.

Drum 32 may have a decimal scale thereon which, when used in connection with various charts supplied with the moisture tester, may be used to determine the moisture content of grains which have not been provided with individual scales on drum 32. Further, the useful moisture range of the instrument may easily be extended by providing scales for lighter weight grain samples, a weight being supplied so that the hopper-scale combination 22 will still be useful in measuring the lighter samples. Upon completion of the measurement, the grain may be removed through opening 24 by inverting the tester.

Figure 2:
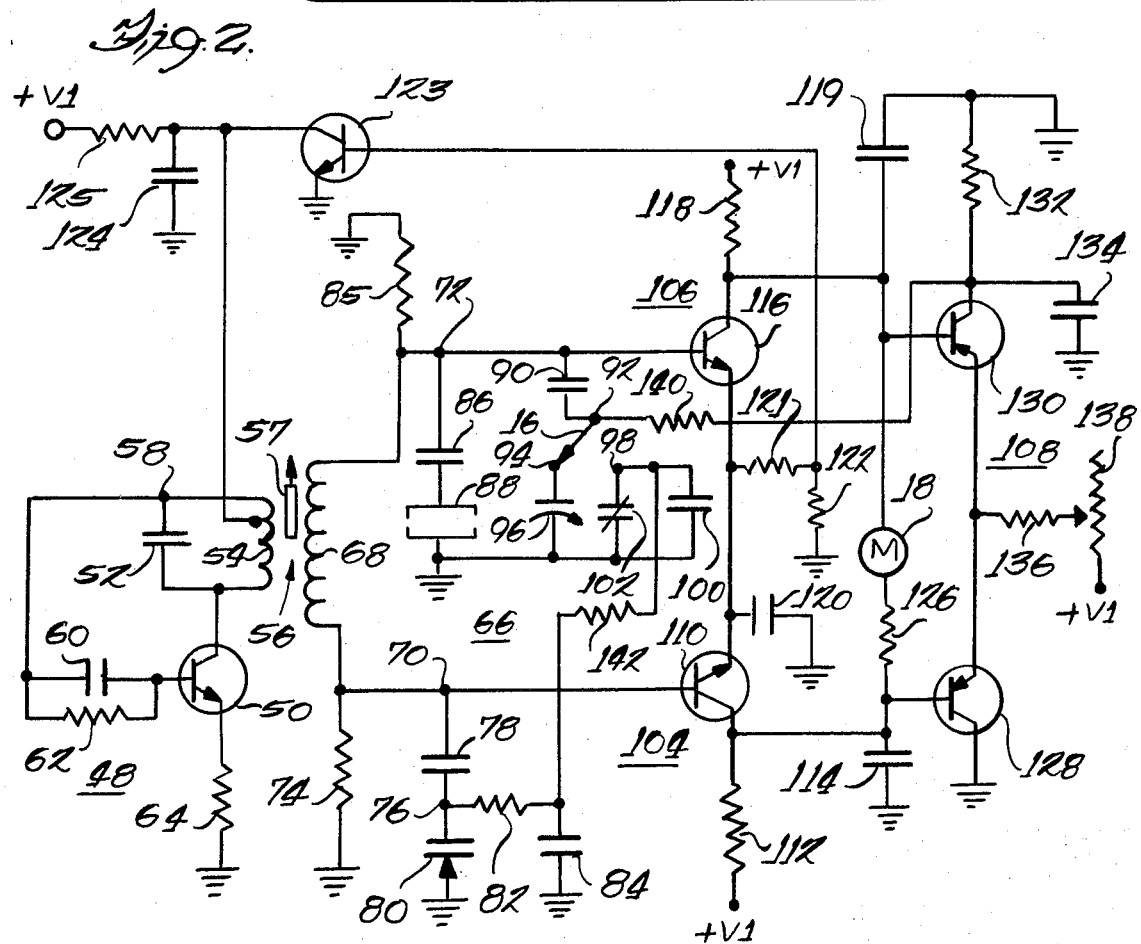
FIG. 2 is a schematic diagram of the electrical circuitry of the grain moisture tester of FIG. 1.

Turning now to FIG. 2, a circuit embodying this invention is there disclosed. It includes a 2 MHertz oscillator 48 comprised in part of an NPN transistor 50 connected as a Hartley oscillator. The collector of transistor 50 is coupled through the parallel combination of a capacitor 52 and a primary winding 54 on a coupling transformer 56 to a circuit point 58 which is, in turn, coupled to the base of transistor 50 through the parallel combination of a capacitor 60 and a resistor 62. The emitter of transistor 50 is coupled to a circuit ground through a resistor 64. A tap on primary winding 54 is coupled to a regulated positive voltage supply as will be explained subsequently.

The output of the oscillator circuit 48 is coupled through transformer 56 to a bridge circuit 66. Transformer 56 includes a variable slug 57 adjusted to maximize the coupling between primary winding 54 and a secondary winding 68 thereof. One end of secondary winding 68 is connected to a circuit point 70 and a second end is connected to a circuit point 72. Circuit point 70 is coupled to ground through a resistor 74 and to a circuit point 76 through a capacitor 78. Circuit point 76 is coupled to ground through varactor diode 80 and through the series combination of a resistor 82 and a storage capacitor 84. Varactor diode 80 is oriented so that its cathode is coupled to circuit point 76.

Circuit point 72 is coupled to ground first through resistor 85 and second through the series combination of a capacitor 86 and the capacitance of a grain cell 88. Cell 88 is comprised, in one embodiment of this invention, of two parallel, rectangular metallic plates, each having dimensions of approximately 5-¾ inches by 4-¾ inches and disposed opposite one another at a distance of approximately one inch to form a capacitor. They may be held in that relationship by a frame of plastic or other material having a high dielectric constant and adapted to maintain the grain under test disposed between the cell plates. With frequencies on the order of 2 MHertz, the impedance of the cell is then primarily dependent on the material between the two plates.

Circuit point 72 is additionally coupled through a capacitor 90 to the armature 92 of balance switch 16. A normally closed contact 94 on switch 16 is coupled to ground through a manually variable circuit element, here a rotary variable capacitor 96, coupled to wheel 30. A normally open contact 98 on switch 16 is coupled through the parallel combination of a capacitor 100 and a trimmer capacitor 102 to ground.

Bridge circuit 66 may, thus, be viewed as being comprised of two arms, an upper arm including fixed capacitors 86 and 90, cell 88, and either variable capacitor 96 or capacitors 100 and 102 depending on the position of switch 16, and a lower arm including capacitor 78 and varactor diode 80. In this disclosed circuit, circuit points 70 and 72 are the bridge null points, i.e., when the difference between the values of the a.c. voltages at those points is zero, the bridge is balanced. (The actual a.c. signals at circuit points 70 and 72 will, however, be 180° out of phase since they are driven from opposite ends of transformer secondary winding 68.) The bridge circuit may be initially balanced with no grain in cell 88 and switch 16 thrown to close contact 98 so that manually variable impedance element 96 is removed from the upper arm and its adjustment does not affect the balance. Balance is achieved by adjustment of the d.c. voltage appearing across varactor diode 80. When switch 16 is returned to its normal position closing contact 94 and grain placed in cell 88, an unbalanced condition will normally result. The presence of grain in cell 88 will increase its capacitance. The degree of rotation of capacitor 96 required to re-establish a balance condition will give an indication of the capacitance of the cell 88 and, thus, of the dielectric constant and the moisture content of the grain within the cell. The moisture content may be read under hairline indicator 34 on the drum 32 when the circuit is returned to a balance condition.

Two detector amplifiers 104 and 106 are coupled to circuit points 70 and 72 to measure the peak a.c. voltages at the bridge null points. A differential amplifier 108 is coupled to the outputs of the detector amplifiers to measure the difference in the peak a.c. voltages appearing at the null points and to adjust the d.c. voltage across varactor diode 80 so that those peak voltages are equal when contact 98 on switch 16 is closed, thus bringing the circuit to a balanced state.

The base of an NPN transistor 110 is connected to circuit point 70 while the collector thereof is coupled to a positive voltage source V1 through a load resistor 112 and to ground through a bypass capacitor 114. The base of an NPN transistor 116 is connected to circuit point 72 while the collector thereof is coupled to positive voltage source V1 through a load resistor 118 and to ground through a bypass capacitor 119. The emitters of transistors 110 and 116 are connected together and coupled to ground through a bypass capacitor 120 in parallel with the series combination of a resistor 121 and a resistor 122.

The junction of resistors 121 and 122 is coupled to the base of an NPN transistor 123 connected in shunt with the power supply for oscillator 48 to regulate the voltage applied thereto. The emitter of transistor 123 is connected to ground while the collector is coupled to a tap on primary winding 54, to ground through a filter capacitor 124, and to the positive voltage supply V1 through a resistor 125. Since emitter resistors 121 and 122 are common to both transistors 110 and 116, a voltage proportional to the total current in the output circuits of those transistors will be applied to the base of transistor 123. The shunt action of transistor 123 across the power supply to oscillator 48 will thus tend to maintain the current through resistors 121 and 122, and, therefore, the total of the peak values of the a.c. signals at circuit points 70 and 72, constant regardless of changes in the value of supply voltage V1 or the values of the circuit parameters brought about by operation of the circuit or aging of components.

A series combination of zero center reading meter 18 and a resistor 126 is connected between the collectors of transistors 110 and 116, the meter indicating the difference in d.c. voltages appearing at those collectors. The base of a PNP transistor 128 is connected to the collector of transistor 110 and the collector is connected to ground. The base of a PNP transistor 130 is connected to the collector of transistor 116 and the collector is coupled to ground through the parallel combination of resistor 132 and capacitor 134. The emitters of transistors 128 and 130 are coupled together and thence through a resistor 136 and a variable resistor 138 to the source of positive voltage V1. The output of differential amplifier 108 is taken from the collector of transistor 130 and is coupled through a resistor 140 to armature 92 of switch 16. The normally open contact 98 of switch 16 is coupled through a resistor 142 to the junction of resistor 82 and capacitor 84.

Transistors 110 and 116 in amplifiers 104 and 106, respectively, develop at their collectors d.c. voltages proportional to the peak values of the a.c. signals appearing at circuit points 70 and 72. Differential amplifier 108 develops at its output a signal proportional to the difference between the d.c. voltages on the collectors of transistors 110 and 116 and, thus, to the difference between the peak a.c. signals at circuit points 70 and 72. When switch 16 is appropriately positioned, the output of differential amplifier 108, a positive signal, is applied through resistors 140 and 142 to capacitor 84 and, thence, through resistor 82 to varactor diode 80. The positive signal on varactor diode 80 is such as to reverse bias that diode and, therefore, control its capacitance as an inversely related function of the applied voltage. Capacitor 84 and resistor 140 are relatively large so that the d.c. voltage applied to varactor diode 80 varies relatively slowly.

In order to initiate operation of the moisture tester and balance bridge 66, switch 16 is thrown to close normally open contact 98. Normally the bridge will be out of balance when the switch 16 is so thrown and the capacitance of varactor diode 80 will be other than that required to balance the bridge. If the capacitance of diode 80 initially exceeds that required for balance, the impedance of the lower bridge arm will be less than that of the upper bridge arm and the peak a.c. signal at circuit point 70 will then be less than that at circuit point 72, the peak a.c. signal at circuit point 70 being less than that at balance and the peak a.c. signal at circuit point 72 being greater than that at balance. The d.c. signals appearing on the collectors of transistors 110 and 116 will, accordingly, be greater than and less than, respectively, the signals there present at balance. Both those differentials will cause the d.c. signal at the output of differential amplifier 108 to exceed that required for balance. Capacitor 84 will thus initially be charged through resistors 140 and 142 to a level which exceeds that required for balance. The reverse d.c. bias applied to varactor diode will, accordingly, increase and the capacitance of diode 108 will decrease. As that capacitance decreases, the difference between the peak values of the a.c. signals at circuit points 70 and 72 will decrease and the output of differential amplifier 108 will approach the balance level as bridge circuit 66 moves toward the balance state. Conversely, if the capacitance of diode 80 is initially less than that required for balance, the output of differential amplifier 108 will be less than that required for balance and capacitor 84 will be allowed to discharge until balance is achieved. The voltage regulating action provided by transistor 123 insures that sufficient signal levels will be present at circuit points 70 and 72 to operate detector amplifiers 104 and 106 and differential amplifier 108.

After the initial balance condition is achieved, as indicated by a zero, center scale reading on meter 18, switch 16 is returned to its normal position closing contact 94. The only d.c. path from circuit point 76 to ground is, then, through the very high leakage resistance of diode 80 and capacitors 84, 100 and 102. The capacitance of diode 80 will thus be held at its balance value for an extended period after switch 16 is returned to its normal position. The moisture tester may then be operated as above described. Capacitors 100 and 102 have a relatively small impedance at the frequency of oscillator 48 relative to the resistance of resistor 142 so that capacitor 84 will have a negligible effect on the impedance of the upper bridge arm. Variable capacitor 102 is provided so that the total capacitance of the combination of capacitors 100 and 102 may be adjusted to some reference level relative to variable capacitor 96.

In one application of the above described circuit, components having the following values were used:

| | |
|---|---|
| Capacitor 52 | 330 picofarads |
| Capacitor 60 | 150 picofarads |
| Resistor 62 | 33 kilohms |
| Resistor 64 | 22 ohms |
| Resistor 74 | 12 kilohms |
| Capacitor 78 | 470 picofarads |
| Resistor 82 | 47 kilohms |
| Capacitor 84 | 0.22 microfarads |
| Resistor 85 | 12 kilohms |
| Capacitor 86 | 100 picofarads |
| Capacitor 90 | 47 picofarads |
| Capacitor 100 | 47 picofarads |
| Resistor 112 | 2.7 kilohms |
| Capacitor 114 | 0.002 microfarads |
| Resistor 118 | 2.7 kilohms |
| Capacitor 119 | 0.002 microfarads |
| Capacitor 120 | 0.01 microfarads |
| Resistor 121 | 680 ohms |
| Resistor 122 | 330 ohms |
| Capacitor 124 | 0.1 microfarads |
| Resistor 125 | 3.3 kilohms |
| Resistor 126 | 10 kilohms |
| Resistor 132 | 4.7 kilohms |
| Capacitor 134 | 0.002 microfarads |
| Resistor 136 | 6.8 kilohms |
| Resistor 138 | 10 kilohms |
| Resistor 140 | 1 megohm |
| Resistor 142 | 47 kilohms |

Positive voltage supply V1 was 9 volts. Variable resistor 138 provides a means for conveniently adjusting the voltage applied to differential amplifier 108 during manufacture to compensate for variations in the components used. The circuit maintained the voltage on varactor diode 80 required for balance for a period of about 30 minutes after establishment of the balance.

It will be obvious that numerous modifications of the specific embodiment shown above may be made without departing from the spirit and scope of this invention. For example, the bridge circuit may have any one of a number of different configurations. Many different circuit arrangements might be used to detect the presence of a balance condition. A variety of methods could be devised for driving the bridge circuit. Further, many initial conditions could be established other than a balance condition, it being required only that two signals be present at the null points having a known relationship when the initial condition is achieved.

It will thus be seen that an automatic balancing circuit for use in impedance measuring circuits and of particular use in grain moisture testers has been provided which fulfills all the above-mentioned objects. While only one particular embodiment of this invention has been shown, it will be understood, of course, that the invention is not to be limited thereto since many modifications may be made. It is contemplated, therefore, by the appended claims, to cover any such modifications as fall within the true spirit and scope of this invention.

I claim:

1. A circuit for measuring the value of an unknown impedance comprising:
   a source of electrical energy;
   a bridge circuit coupled across said source having an arm receiving said unknown impedance and an arm including a variable reactance device;
   differential amplifier means having inputs coupled to the null points of said bridge circuit and an output for controlling the reactance of said device to establish an initial state in said bridge circuit;
   means for switchably connecting said output to said device; and
   means for determining the deviation of said bridge circuit from said initial state when said switch means disconnects said output from said device.

2. The circuit of claim 1 wherein said deviation determining means includes a variable impedance element adjustable to restore said bridge circuit to the initial state.

3. The circuit of claim 1 further comprising means coupled to said bridge circuit and said source for regulating signals from said source applied to said bridge circuit.

4. A circuit for measuring a relative change in the impedance of a physical structure assuming at least first and second configurations and having two electrical terminals comprising:
   a source of electrical energy;
   a bridge circuit coupled across said source having said structure in an arm thereof and a variable reactance device in an arm thereof;
   differential amplifier means having an output for controlling the reactance of said device and having inputs coupled to the null points of said bridge circuit;
   switch means for connecting said output to said variable reactance device when in a first state to establish an initial condition in said bridge when said structure is in said first configuration and disconnecting said output from said variable reactance device when in a second state; and
   means for determining the deviation of said bridge circuit from said initial condition when said switch means is in said second state and said structure is in said second configuration.

5. The circuit of claim 4 further comprising means coupled to said bridge circuit and said source for regulating signals from said source applied to said bridge circuit.

6. The circuit of claim 4 wherein said deviation determining means includes a variable impedance element adjustable to restore said bridge circuit to the initial condition.

7. The circuit of claim 4 wherein said variable reactance device is a varactor diode.

8. A relative impedance measuring circuit for determining the moisture content of material under test comprising:
   a source of a.c. energy;
   a cell for receiving said material;
   a bridge circuit coupled across said source having said cell in an arm thereof and a variable reactance device in an arm thereof;
   differential amplifier means having an output for controlling the reactance of said device and having inputs coupled to the null points of said bridge circuit;
   switch means for connecting said output to said device and establishing an initial state in said bridge circuit when in a first mode and disconnecting said output from said device when in a second mode; and
   means for determining the deviation of said bridge circuit from said initial state when said switch means is in said second mode.

9. The circuit of claim 8 further comprising means coupled to said bridge circuit and said source for regulating signals from said source appearing at said null points.

10. The circuit of claim 8 wherein said determining means includes a variable impedance element adjustable to restore the bridge circuit to said initial state.

11. The circuit of claim 10 wherein said variable reactance device is a varactor diode.

12. The circuit of claim 11 wherein said switch means removes said variable impedance element from said bridge circuit when in said first mode and returns it to said bridge circuit when in said second mode.

13. The circuit of claim 12 wherein said variable impedance element is a manually variable capacitor.

* * * * *